United States Patent [19]

Ishiyama

[11] 4,258,477

[45] Mar. 31, 1981

[54] MULTIPLICATION STUDY DEVICE

[75] Inventor: Shozo Ishiyama, Tokyo, Japan

[73] Assignee: Gakken Co., Ltd., Tokyo, Japan

[21] Appl. No.: 98,241

[22] Filed: Nov. 28, 1979

[30] Foreign Application Priority Data

Dec. 14, 1978 [JP] Japan .............................. 53-172844[U]
Jan. 24, 1979 [JP] Japan ................................ 54-7953[U]

[51] Int. Cl.³ .............................................. G09B 3/00
[52] U.S. Cl. ..................................... 434/202; 434/209; 434/348
[58] Field of Search ...................... 35/9 R, 31 R, 31 B, 35/31 C

[56] References Cited

U.S. PATENT DOCUMENTS

| | | | |
|---|---|---|---|
| 1,673,659 | 6/1928 | Anderson | 35/9 R |
| 3,572,719 | 3/1971 | Span | 273/139 |

OTHER PUBLICATIONS

Advertisement "Merry Multiplier," Parade Magazine Suppl., May 18, 1969, p. 12.

Primary Examiner—Anton O. Oechsle
Attorney, Agent, or Firm—Irving M. Weiner; Pamela S. Burt; John L. Shortley

[57] ABSTRACT

A multiplication study device for teaching a student multiplication skills by operation of push-buttons mounted in a box-shaped case. The push-buttons are each provided with a semi-transparent see-through surface which permits the appearance therethrough of an answer to a multiplication problem when the push-button is depressed so as to come into contact with a projecting member disposed therebelow. A plurality of the push-buttons are mounted in the case, and the case includes a rear cover for mounting the projecting members. A common resilient member in the form of a urethane plate is employed for normally urging the push-buttons in an upward direction.

6 Claims, 7 Drawing Figures

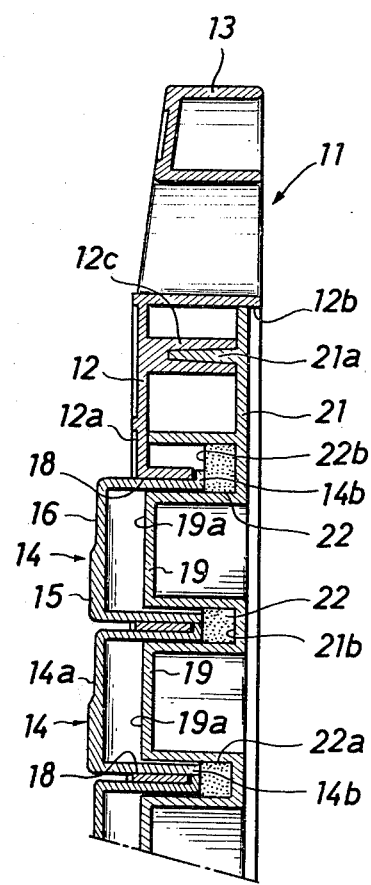
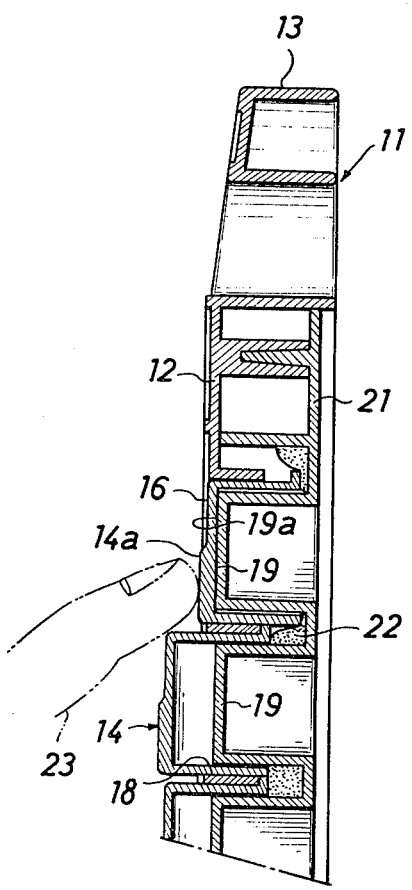

MULTIPLICATION STUDY DEVICE

BACKGROUND OF THE INVENTION

The present invention relates to a multiplication study device which permits a student to learn multiplication skills by operating push-buttons.

Various educational study devices are known for teaching a student the skill of multiplication. Such devices employ various mechanisms in which an answer element corresponding to a question or problem element is obtained by operating an operating member. Because such study devices are produced in quantity and sold on a widespread scale, it is generally required that the number of component parts employed be minimized, and that the construction be simplified. However, with regard to the operating member and associated members for indicating the answer element corresponding to the question element, known mechanisms have tended to be very complex. There has thus developed a desideratum for a study device which meets the aforesaid requirements effectively, and which has a simplified structure and reduced cost of manufacture.

The present invention provides a multiplication study device which effectively satisfies the above described general requirements.

SUMMARY OF THE INVENTION

The present invention provides a multiplication study device which comprises a case, the surface of which is provided with eighty-one holes penetrating therethrough, and eighty-one substantially hollow push-buttons having an opened rear side and adapted to move up and down through the respective holes of the case. Each push-button has at least a part of the upper surface thereof formed as a semi-transparent see-through surface. Eighty-one projecting members are disposed on the rear sides, respectively, of the push-buttons, for slidably supporting and guiding the push-buttons vertically. Each of the projecting members is provided with a multiplication answer marked on that portion of the top surface thereof which faces the see-through surface of the push-button. A resilient member is provided for urging the push-buttons to move upwardly along the projecting members. Pressing down the push-button against the force of the resilient member causes the upper surface of the push-button to approach and contact the top of the projecting member such that the multiplication answer marked on the top of the projecting member appears through the see-through surface of the push-button.

An object of the present invention is to provide a multiplication study device which has a simplified construction employing a minimum number of component parts. In accordance with the invention, the case, the push-buttons, the projecting members and the resilient member provide a simplified construction. Further, at least a part of the upper surface of each push-button is semi-transparent so that the multiplication answer can be made to appear through the semi-transparent and see-through surface.

Another object of the present invention is to provide a multiplication study device wherein the case is formed into a box with the rear side thereof opened, and the eighty-one projecting members are formed integrally with a rear member which is fitted to the case to cover the rear opening thereof. In this manner, all of the projecting members can be rigidly mounted in the interior of the case simply by fitting the rear member to the case, resulting in a simplified structure and assembly procedure.

Still another object of the present invention is to provide a multiplication study device wherein the resilient member is formed by a urethane plate of substantially constant thickness having eighty-one holes penetrating therethrough at locations corresponding to the locations of the projection members so as to receive same. The lower ends of all the push-buttons can be made to contact the surface of the urethane plate by inserting the projecting members into the respective holes, such that one urethane plate serves as a common resilient member for all eighty-one push-buttons, thus eliminating the necessity for providing each push-button with an individual resilient member.

Other objects and advantages of the present invention will become apparent from the following description, when read in conjunction with the accompanying drawings.

BRIEF DESCRIPTION OF THE DRAWINGS

FIG. 2 is a partially sectional view taken along line 2—2 of FIG. 1.

FIG. 3 is a partially sectional view, similar to FIG. 2, of a multiplication study device with a push-button depressed.

DETAILED DESCRIPTION OF PREFERRED EMBODIMENTS

Figure 1:
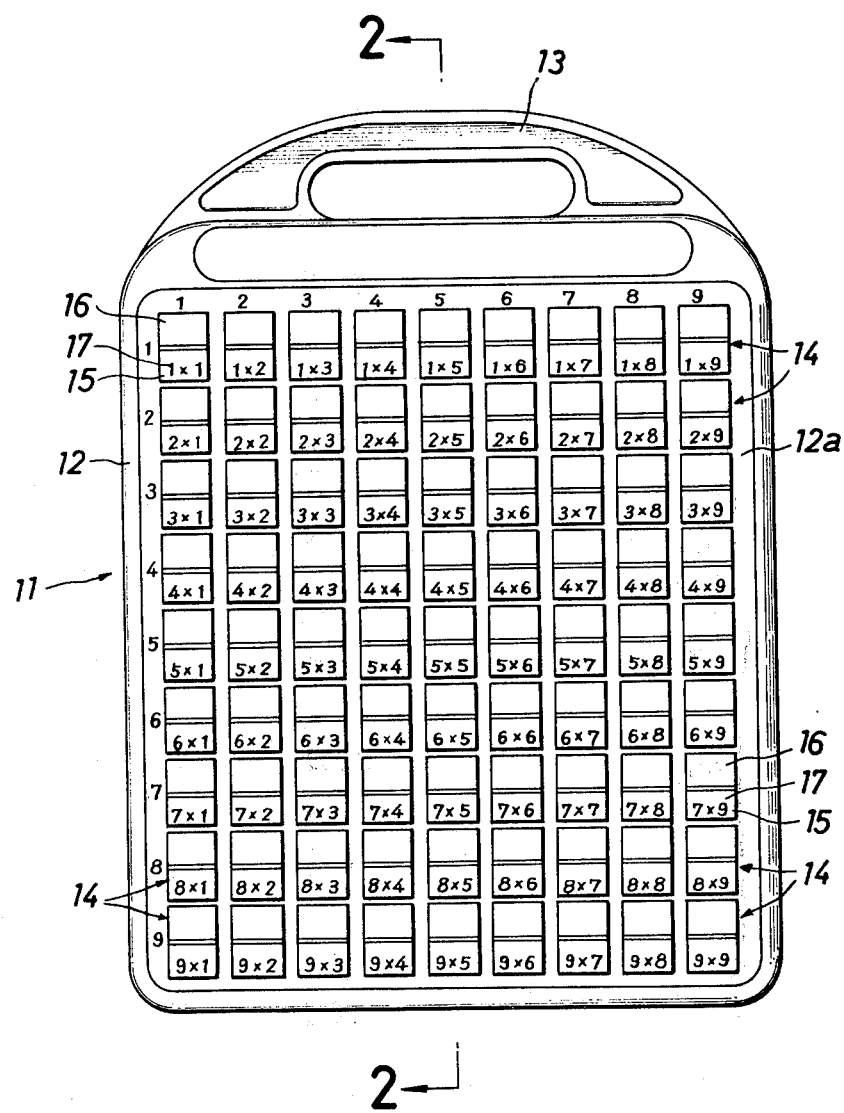
FIG. 1 is a plan view showing a multiplication study device in accordance with the present invention.

With reference to FIGS. 1-3, there is shown a case 12 which constitutes the main body of a multiplication study device 11. The case 12 has a substantially flat shape with a large area, and is provided with a handle grip 13. On a surface 12a of case 12 are arranged in substantially equi-spaced relation eighty-one push-buttons 14, arranged in nine vertical columns and nine horizontal rows. Each of the push-buttons 14 has substantially the same configuration, i.e., each push-button 14 is substantially hollow and includes an opening on the rear thereof. As shown in FIG. 2, each push-button 14 has a stepped upper surface 14a, including an upper raised portion 15 and a lower depressed portion 16. The depressed portion 16 forms a semi-transparent see-through surface through which the operator can find the answer to a particular multiplication problem. The depressed see-through surface 16 of push-button 14 is substantially thin and semi-transparent, and is preferably made of a milky-pure synthetic resin material. The raised portion 15 has a multiplication problem 17 (FIG. 1) marked on the upper surface thereof, with an answer to the problem 17 appearing through the see-through surface 16 during operation of the device.

The surface 12a of case 12 is provided with eighty-one holes 18 extending therethrough and arranged in vertical columns and horizontal rows which are substantially regularly-spaced. The case 12 is also provided with eighty-one projecting members 19 rigidly mounted therein. Each of the projecting members 19 is secured in the interior of case 12 and is adapted to face the corresponding hole 18. The top portion 19a of the projecting member 19 has displayed thereon the answer 20 to the multiplication problem, as shown in FIG. 16. The projecting member 19 is slightly smaller than the interior chamber of the push-button 14 to permit the push-button to be slidably received by the projecting member 19. The projecting member 19 is thus slidably supported and vertically guided by the push-button 14.

The answer 20 is marked on that part of the top portion 19a of projecting member 19 which faces the see-through surface 16 of push-button 14. The case 12 is formed into a flat box with the back 12a thereof opened and is provided with a rear member 21 fitted into the back 12b, as shown in FIG. 2. The rear member 21 is provided with eighty-one projecting members 19 formed integrally therewith, such that the projecting members 19 project toward the surface of case 12. The rear member 21 can be mounted to the case 12 by pressing into a cylinder 12c of case 12 a projection 21a formed substantially at the end of the rear member 21, such that all the projecting members 19 are rigidly secured within case 12. Arranged on the surface 21b of rear member 21 is a resilient member 22 which imparts a resilient upward force to the push-button 14 slidably engaging with the outer surface of the projecting member 19. In this manner, the push-button 14 is slidable in the hole of the case 12 and the upper surface 14a thereof is urged by the resilient member 22 to project from the surface 12a of case 12. When the push-button 14 is projected, the upper surface 14a of the push-button 14 moves away from the top portion 19a of the projecting member 19 with a predetermined gap therebetween, such that the answer 20 indicated on the top portion 19a cannot be seen through the semi-transparent see-through surface 16.

Figure 4:
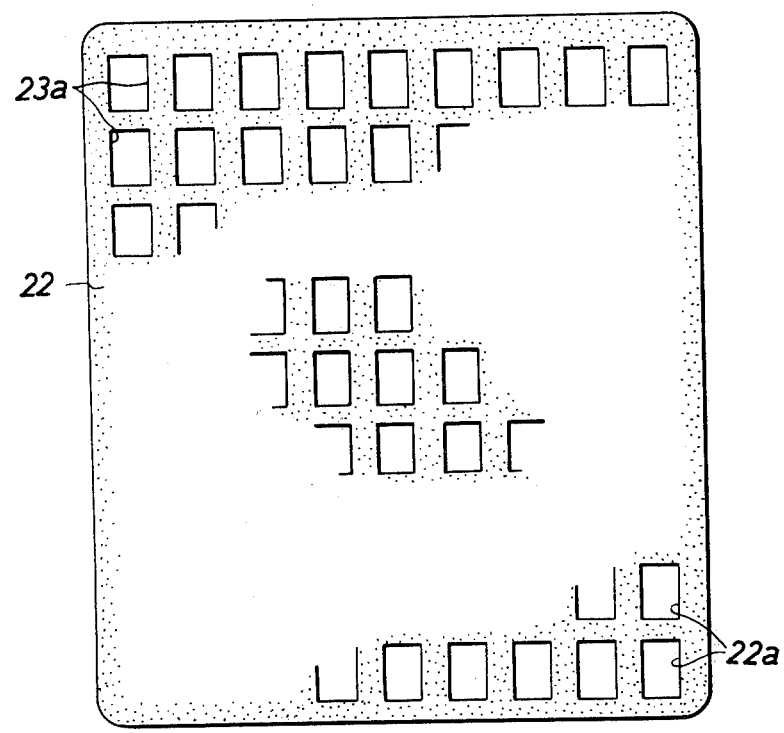
FIG. 4 is a plan view of a resilient urethane plate.
Figure 5:
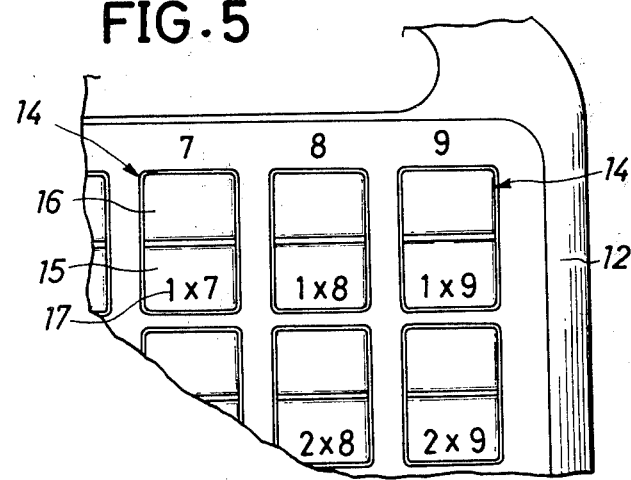
FIG. 5 is a partially enlarged plan view of the multiplication study device.

FIG. 4 shows in detail the construction of the resilient member 22 which is formed of a foamed flexible urethane plate material. The urethane plate 22 is of substantially constant thickness and has a large area equal to that of the surface 12a of the case 12. The urethane plate 22 is provided with holes 22a penetrating therethrough at locations corresponding to the locations of the projecting members 19, and the number of holes 22a is equal to the number of projecting members 19. The projecting members 19 are inserted into the respective holes 22a, and the urethane plate 22 is bonded to the surface 21b of the rear member 21 with a suitable bonding agent. As a result, the urethane plate 22 is interposed between the surface 21b of the rear member 21 and the push-button 14, and the lower ends 14b of push-buttons 14 contact the surface 22b of urethane plate 22. In this manner, a single sheet of urethane plate material serves as a common resilient member for all of the push-buttons 14.

Figure 6:
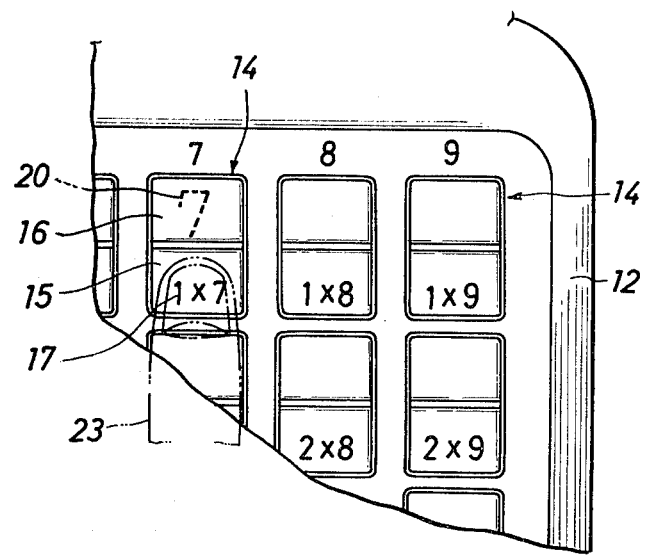
FIG. 6 is a partially enlarged plan view, similar to FIG. 5, of the multiplication study device with a push-button depressed.

In operation, when a student studies multiplication problems on the study device, the push-button 14 is depressed by the student's finger 23, as shown in FIG. 3. In this manner, the push-button 14 is moved down along the projecting member 19 against the resilient force of urethane plate 22 so as to bring the upper surface 14a closer to the top portion 19a of projecting member 19 and finally into contact with same. As a result, as shown in FIG. 6, the answer 20 displayed on the top portion 19a of projecting member 19 appears through the see-through surface 16 such that the student will be informed of the correct answer to the multiplication problem or equation 17 marked on the upper surface 14a of push-button 14. When the student's finger 23 is released from the push-button 14, the push-button 14 is moved upwardly along the projecting member 19 by the force of the compressed urethane plate 22, returning the push-button 14 to the original position thereof such that the answer 20 disappears from the see-through surface 16.

Figure 7:
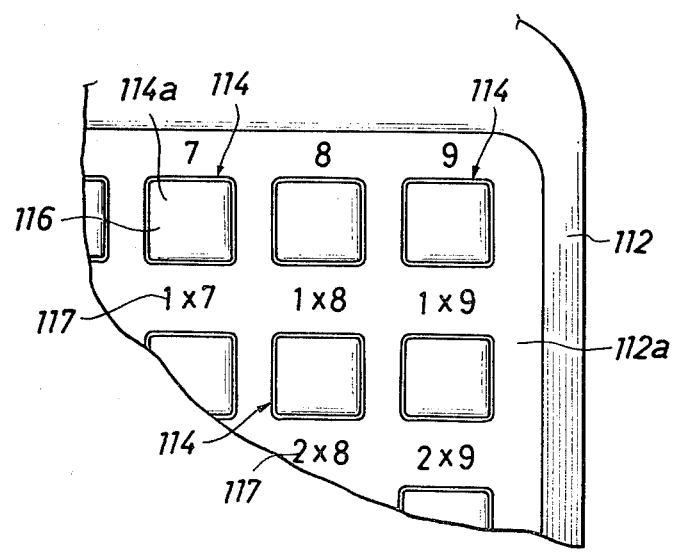
FIG. 7 is a partially enlarged plan view of one embodiment of the multiplication study device, with multiplication equations displayed on the surface of the case thereof.

As shown in FIG. 7, question equation 117 need not necessarily be marked on the push-button, and alternatively may be indicated on the surface 112a of case 112 for each push-button 114. In the embodiment of FIG. 7, the whole area of the upper surface 114a of the push-button 114 is formed as a semi-transparent see-through surface 116, such that the answer marked on the top portion of the projecting member can be seen through the see-through surface 116 by depressing the push-button 114, in much the same manner as described hereinabove.

Although there have been described what are at present considered to be the preferred embodiments of the invention, it will be understood that the present invention may be embodied in other specific forms without departing from the spirit or essential characteristics thereof. The present embodiments are therefore to be considered in all respects as illustrative, and not restrictive. The scope of the invention is indicated by the appended claims rather than by the foregoing description.

I claim:

1. A multiplication study device, comprising:
a case provided with a plurality of holes penetrating therethrough;
a plurality of substantially hollow push-buttons having opened rear sides, each said push-button being adapted to move up and down through a respective one of said holes;
each said push-button having at least a part of the upper surface thereof formed as a substantially semi-transparent see-through surface;
a plurality of projecting members respectively disposed on the rear side of respective ones of said push-buttons for slidably supporting and guiding said push-buttons;
each said projecting member having a multiplication answer marked on that portion of the top surface thereof which faces said see-through surface of said push-buttons;
a resilient member for urging said push-buttons to move upwardly along said projecting members; and
whereby pressing down of said push-button against the force of said resilient member causes the upper surface of said push-button to approach and contact the top of said projecting member such that said multiplication answer marked on the top of said projecting member appears through said see-through surface of said push-button.

2. A multiplication study device according to claim 1, wherein:
said device includes eighty-one of said holes in said case, eighty-one of said push-buttons, and eighty-one of said projecting members.

3. A multiplication study device according to claim 2, wherein:

said case is formed into a box having an open rear side;

a rear member is fitted to said case so as to cover said open rear side thereof; and said eighty-one projecting members are formed integrally with said rear member and project toward the surface of said case.

4. A multiplication study device according to claim 3, wherein:

said resilient member comprises a urethane plate of substantially constant thickness;

said urethane plate is provided with eighty-one holes formed therethrough at locations corresponding to the locations of said eighty-one projecting members so as to receive said projecting members; and said urethane plate is affixed to the surface of said rear member having projecting members integrally formed therewith such that the lower ends of each said push-button contacts the upper surface of said urethane plate.

5. A multiplication study device according to claim 1 or 2, wherein:

each said push-button has said see-through surface provided at one portion of the upper surface thereof, with the remaining portion of the upper surface thereof having a multiplication problem corresponding to said answer marked thereon.

6. A multiplication study device according to claim 1, wherein:

a multiplication problem is marked on the surface of said case for each said push-button.

* * * * *